United States Patent Office 3,501,491
Patented Mar. 17, 1970

3,501,491
3-CYCLOPROPYL-5-DICHLOROMETHYL-1,2,4-OXADIAZOLE
Lee V. Phillips and Archie J. Latham, Overland Park, Kans., assignors to Gulf Research & Development Company, Pittsburgh, Pa., a corporation of Delaware
No Drawing. Original application May 2, 1966, Ser. No. 546,509. Divided and this application Mar. 17, 1969, Ser. No. 834,579
Int. Cl. C07d 85/52
U.S. Cl. 260—307         1 Claim

ABSTRACT OF THE DISCLOSURE

3 - cyclopropyl - 5 - dichloromethyl - 1,2,4 - oxadiazole, useful in controlling nematodes.

---

This application is a division of Ser. No. 546,509 filed May 2, 1966.

The present invention relates to a method of controlling nematodes, employing a novel composition which remains effective, even when the concentration in the soil has declined to no more than one part per million.

Severe problems arising from nematode infestations in the vicinity of the roots of growing crops were recognized many years ago. It is well known that modern agricultural practices involving higher plant populations tend to make these problems more serious. Nematode infestations are particularly troublesome in the growing of tobacco, pineapples, cotton, cucumbers, tomatoes and sugar beets.

Plant biologists have been inclined in the past to assume that the best and cheapest means of controlling plant pests is to develop new varieties of plants which are resistant to the particular pest. In the case of soil-borne root diseases, however, it may not be feasible to solve the problem in this way.

There exist so many inter-relationships between soil microorganisms and various pests, such as nematodes, that soil-borne plant diseases are very complex in nature, as well as very numerous. This situation greatly reduces the probability of development of useful resistant strains of plants, since a new variety would have to possess many different kinds of resistance at the same time in order to be useful.

A direct correlation between Fucarium wilt in tomatoes and Meloidagyne nematode infestation of the soil was observed as early as 1892. This particular inter-relationship has been given a great deal of study. A disturbing aspect of the problem is that the effect of the complex of the two organisms appears to be synergistic, rather than additive. In recent years many other fungus-nematode plant disease complexes have been recognized and studied. Species of at least 14 genera of plant parasitic nematodes have been implicated or proved to play some role in pathological situations in which the nematode and other parasitic organisms contribute to the total disease syndrome. The problem has been investigated extensively and is reviewed, for example, in the following publications by N. T. Powell, Phytopathology, vol. 53, pp. 28 to 35 (January 1963) and by H. M. Miller, Proceedings of Soil and Crop Society of Florida, vol. 24, pp. 310 to 325 (1964).

As a consequence of the nature and the urgency of the nematode problem, chemical methods of control are the only ones offering any substantial degree of success within the foreseeable future and are the ones being relied on at present. The principal method of control employed is fumigation of soil with volatile liquids. Chloropicrin (trichloronitromethane) has probably the longest history of successful use, although exacting control of several critical factors is necessary to obtain desired results. (See U.S.D.A. Yearbook of Agriculture, 1963, pages 123–124.)

Soil fumigation kills both beneficial and nonbeneficial organisms, so that when a pathogenic organism again infests a soil after fumigation, the infestation is often more severe because of the absence of competing organisms. At least one crop can be grown after fumigation before the nematode population is re-established. However, in experiments with sugar beets it has been observed that on the following year, damage from nematodes was more severe on previously fumigated land than on non-fumigated land. Normally, a delay of one to three weeks following fumigation is necessary before planting, since the fumigant is toxic to seeds and growing plants.

A more satisfactory approach to control of nematodes is to incorporate in the soil non-phytotoxic chemical agents which are specifically effective against nematodes and possibly also against pathogenic fungi, but which do not affect the normal soil bacteria and other beneficial and competing organisms. The search for satisfactory specific chemical agents is a continuing one, none having been discovered which possesses to an outstanding degree all of the characteristics which are desired in such a composition.

U.S. Patent 3,192,103 proposes that oxadiazoles be employed as nematocides, of which certain individual 1,2,4-oxadiazoles appear to be the most effective. It has been found, however, that these substances are toxic to plants and non-pathogenic organisms at higher concentrations and when the concentration of these agents in the soil declines to the level of 1 to 3 parts per million, they are relatively inaffective against nematodes. This greatly reduces the length of time during which one application of the chemical remains effective if reasonable concentrations are employed. The kill of competing organisms followed by rapid decline of toxicity increases the possibility of resurgence of the nematode infestation, perhaps complicated by development of resistant strains of nematodes.

It has now been discovered that 3-cyclopropyl-5-dichloromethyl-1,2,4-oxadiazole is non-phytotoxic and has unique effectiveness against nematodes, even at very low concentrations, so that the nematocidal action is greatly prolonged. The combination of non-phytotoxicity and greater effectiveness at low concentrations makes prolonged control of nematodes feasible, since nematocidal concentrations in the soil can be maintained by repeated application after planting. The present invention, briefly, comprises applying the soil a composition containing 3-cyclopropyl-5-dichloromethyl-1,2,4-oxadiazole in quantities toxic to said nematodes.

The following discussion is presented so as to clearly illustrate the invention.

3 - cyclopropyl-5-dichloromethyl-1,2,4-oxadiazole was prepared according to the following procedure.

(A) PREPARATION OF CYCLOPROPANE-CARBOXAMIDOXIME

While the temperature was kept below 35° C., a solution of 66.2 g. of sodium methoxide in 325 ml. of methanol was added slowly to a stirred solution of 85 g. of hydroxylamine hydrochloride in 650 ml. of methanol. The mixture was stirred for 30 minutes, then filtered to remove the precipitated sodium chloride. To the hydroxylamine solution was added 75 g. of cyclopropyl cyanide and this solution was stirred at room temperature for 18 hours. The methanol was removed under reduced pressure to leave 92.6 g. of cyclopropanecarboxamidoxime which was employed for preparation of 3-cyclopropyl-5-dichloromethyl-1,2,4-oxadiazole without additional purification.

(B) PREPARATION OF 3-CYCLOPROPYL-5-DICHLOROMETHYL-1,2,4-OXADIAZOLE

A solution of 40.2 g. (0.4 mole) of cyclopropanecarboxamidoxime and 500 ml. of dry acetone was stirred and kept below 30° C. while a solution of 100 g. (0.417 mole) of dichloroacetic anhydride and 75 ml. of acetone was added slowly. The solution was stirred at room temperature for 2 hours, then the solvent was removed under reduced pressure. The oil which remained was taken up in 500 ml. of methylene chloride and stirred while a solution of 44.7 g. (0.42 mole) of sodium carbonate in 150 ml. of water was added slowly. After thorough shaking to insure complete neutralization, the organic phase was removed and dried over magnesium sulfate. The solvent was removed under reduced pressure and the residue was diluted to yield 57.7 g. of colorless liquid, B.P. 63–65° (2 mm.); $n_D^{14}$ 1.5068.

Other oxadiazoles exemplified in U.S. Patent 3,192,103 were prepared according to the procedures disclosed in the patent. In addition, isopropyl and normal propyl oxadiazoles corresponding in structure to the cyclopropyl compound were synthesized by a procedure which corresponded to that given above. The oxadiazole compositions were compared for their effectiveness in the control of nematodes at concentrations of 1 and 2.5 parts per million in nematode infested soil in which cucumber plants were growing. The procedure employed in the comparative tests is described briefly below.

Selected oxadiazoles were intimately mixed in 2 percent concentration with attapulgus clay as an inert diluent. The clay containing 2 percent active ingredient was then mixed with soil infested with root knot nematodes in a Patterson-Kelly blender and poured into clay pots 2½ inches in diameter. Labels were applied to the pots, 4 cucumber seeds were planted in each pot and the pots were incubated 30 days in the greenhouse. Four separate pots were prepared for each chemical agent at each concentration level. After 30 days, the soil was carefully washed away from the roots of the cucumber plants and the root knot galls were counted in each pot. Gall formation in excess of 100 per pot was approximated after actual counting of several examples and setting up standards for visual comparison. The set of pots containing no chemical agent contained an average of over 200 galls per pot. The average scores in number of galls per pot for each of the chemical agents are tabulated below:

TABLE I

| Name of compound | Number of galls per pot | |
|---|---|---|
| | 2.5 p.p.m. | 1 p.p.m. |
| 3-cyclopropyl-5-dichloromethyl-1,2,4-oxadiazole | 3.7 | 19.2 |
| 3-isopropyl-5-dichloromethyl-1,2,4-oxadiazol | 175.0+ | 187.5+ |
| 3-n-propyl-5-dichloromethyl-1,2,4-oxadiazole | 86.2+ | 167.5+ |
| 3-methyl-5-trichloromethyl-1,2,4-oxadiazole | 175.0+ | 175.0+ |
| 3-chloromethyl-5-trichloromethyl-1,2,4-oxadiazole | 146.2+ | 150.0+ |
| 3-methyl-5-chloromethyl-1,2,4-oxadiazole | 112.5 | 200.0+ |
| 3-methyl-5-dichloromethyl-1,2,4-oxadiazole | 98.7+ | 137.5+ |
| 3-isopropyl-5-trichloromethyl-1,2,4-oxadiazole | 200.0+ | 200.0+ |
| 3-chloromethyl-5-dichloromethyl-1,2,4-oxadiazole | 72.0 | 137.5+ |
| 3-ethyl-5-trichloromethyl-1,2,4-oxadiazole | 105.0+ | 180.0+ |
| 3-chloromethyl-5-phenyl-1,2,4-oxadiazole | 187.5+ | 187.5+ |
| 3-cyclopentyl-5-trichloromethyl-1,2,4-oxadiazole | 95.0 | 175.0+ |

From examination of the tabulated data it will be seen that only the one composition listed at the top of the table provides substantial protection against nematodes in concentrations as low as 1 to 3 parts per million. The other compounds lose their effectiveness at these low concentrations. Comparison of the cyclopropyl compound with corresponding isopropyl and normal propyl compounds demonstrates the unique effect of the cyclopropyl substituent in the 3-position. Comparison with the 3-cyclopentyl compound disclosed specifically in the patent mentioned above shows that other cycloalkyl groups do not exert an effect comparable to that of the cyclopropyl group.

Members of the group of 1,2,4-oxadiazole compounds were compared with respect to phytotoxicity by drenching pots containing three growing tomato seedlings with an aqueous dispersion of the active compound at a concentration of 100 parts per million. Three pots containing a total of nine plants were employed in each experiment. The results are tabulated below:

TABLE II

| Name of compound | Plants surviving | |
|---|---|---|
| | After 4 days | 7 days |
| 3-cyclopropyl-5-dichloromethyl-1,2,4-oxadiazole | 9 | 8 |
| 3-methyl-5-trichloromethyl-1,2,4-oxadiazole | 5 | 3 |
| 3-chloromethyl-5-trichloromethyl-1,2,4-oxadiazole | 0 | 0 |
| 3-methyl-5-chloromethyl-1,2,4-oxadiazole | 0 | 0 |
| 3-methyl-5-dichloromethyl-1,2,4-oxadiazole | 9 | 6 |
| 3-isopropyl-5-trichloromethyl-1,2,4-oxadiazole | 3 | 1 |
| 3-chloromethyl-5-dichloromethyl-1,2,4-oxadiazole | 0 | 0 |
| 3-ethyl-5-trichloromethyl-1,2,4-oxadiazole | 1 | 1 |
| 3-chloromethyl-5-phenyl-1,2,4-oxadiazole | 3 | 2 |
| 3-cyclopentyl-5-trichloromethyl-1,2,4-oxadiazole | 0 | 0 |

It will be seen that after a period of seven days, only one plant died in the pots which were treated with the composition of the present invention. Loss of plants sprayed with the other compositions, however, was substantial. These results indicate that the novel compound can be safely applied, if desired, as a spray above ground at rather high concentrations in the vicinity of a growing crop and when it soaks into the soil, will remain effective as a nematocide for an extended period. The phytotoxicity of the other compounds, coupled with their poor performance at very low concentrations precludes their use in this manner.

In other tests it has been demonstrated that 3-cyclopropyl-5-dichloromethyl-1,2,4 - oxadiazole may be safely applied in concentrations of 100 lbs./A. in the vicinity of growing crops of 29 species, including tomatoes, beans, corn, cucumbers, squash, eggplant, radishes, sugar beets, peanuts and cotton. There were no dead or permanently injured plants.

The application of the novel nematocide as an aboveground spray in a standing crop is a very convenient method which is preferred for crops that have attained so much growth that it is difficult to gain access to the space between the rows. A preferred method in fields with easier access between the rows is to apply the nematocide in granular form as a side-dressing in a manner similar to the customary side-dressing with granular fertilizer. For reasons of economy, the fertilizer and nematocide will normally be applied together as a side-dressing during a single pass through the field. The nematocide may also be employed in combination with selective weed control agents, if desired. On crops with a very long period of growth it may be necessary to repeat applications during the growing season. For applications late in the growing season the overhead spray will usually be more convenient. At or prior to planting time, applications are preferably carried out by incorporation in the soil and may be combined with customary applications of fertilizer, soil fungicides and insecticides. Regardless of the particular procedure which is employed, it is preferred to make the first application to the soil in a non-phytotoxic formulation prior to germination of the crop seeds, so as to protect immature plants from injury by nematodes.

What is claimed is:
1. 3-cyclopropyl-5-dichloromethyl-1,2,4-oxadiazole.

References Cited

UNITED STATES PATENTS 3,192,103   6/1965   Sousa et al. _____ 260—307

ALTON D. ROLLINS, Primary Examiner